COLOR TELEVISION RECEIVER INCLUDING A COMBINED CHROMA AMPLIFIER AND BURST SEPARATOR
Filed March 21, 1963
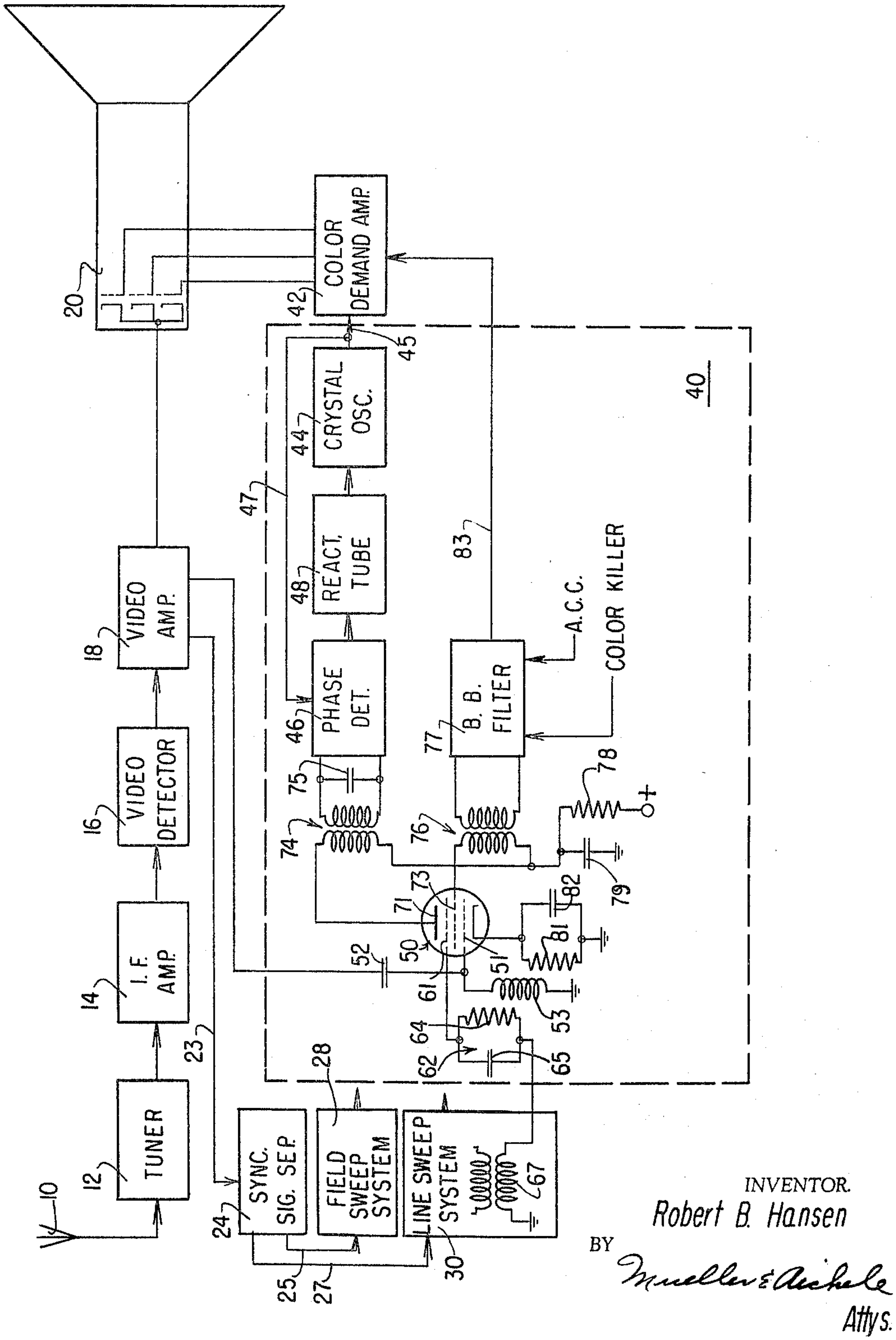
INVENTOR.
Robert B. Hansen
BY Mueller & Aichele
Attys.

United States Patent Office 3,270,127
Patented August 30, 1966

3,270,127

COLOR TELEVISION RECEIVER INCLUDING A COMBINED CHROMA AMPLIFIER AND BURST SEPARATOR

Robert B. Hansen, Arlington Heights, Ill., assignor to Motorola, Inc., Chicago, Ill., a corporation of Illinois Filed Mar. 21, 1963, Ser. No. 266,904
1 Claim. (Cl. 178—5.4)

This invention relates to color television receivers and more particularly to a circuit for amplifying the chroma signal in such receivers and for separating the color burst reference signal therefrom.

The standard composite color television signal includes, in addition to blanking and synchronizing components and color intensity components which are combined in proper proportions for monochromatic reception, a chroma signal for use in receivers designed for color reception. The chroma signal is comprised of color subcarrier sideband components which are phase and amplitude modulated with distinct chroma information, and a color reference signal component which is used for synchronous demodulation of the color subcarrier at the receiver. The color reference signal component is present in the composite signal as a periodically recurring burst during the blanking interval of the received composite color television signal, and is positioned immediately after the horizontal synchronizing pulses of such signal. The color subcarrier sideband components are present during the video information portion of the composite color signal.

In a standard color television receiver an amplification channel separate from the video information channel is provided to supply the color subcarrier sideband signal components of the received composite color television signal to the color demodulation system of the receiver. It is further necessary to separate the color burst reference signal component from the chroma signal so that it may be supplied to an automatic phase control circuit which develops a reference signal of proper phase and frequency for synchronous demodulation of the color subcarrier sideband components. Separation of the reference signal component from the chroma signal is usually achieved by an amplifier which is periodically gated into conduction by keying pulses developed during the blanking interval of the received composite color signal so that the accompanying color burst reference signal component is translated therein to the exclusion of color subcarrier sideband components which are present between blanking intervals.

For reliable color reproduction it is necessary that the color subcarrier sideband signal components supplied to the color demodulator and the separated reference signal component which is used in developing a reference signal in conjunction with the automatic phase control circuit be selectively amplified so that they are at a level which is free from noise and other interfering signals that may impair synchronous demodulation in the receiver. This usually entails the use of one or more passband amplifier stages to selectively amplify chroma signals in the 2 to 4.1 megacycle frequency range, as well as separate circuit means to provide selective amplification and separation of the 3.58 megacycle color burst reference therefrom.

It is, therefore, among the objects of the present invention to provide simplified, improved circuit means to selectively amplify color subcarrier sideband signal components and to separate and amplify the color burst reference signal component accompanying the received composite television signal of a color television receiver.

Another object is to provide, in a color television receiver, simplified circuit means for performing the dual functions of selectively amplifying color subcarrier sideband signal components and of separating the color burst reference signal components which accompany a received composite color television signal.

A further object is to provide a simplified circuit which utilizes a minimum of components and is economical to construct for translating color subcarrier sideband signal components and a color burst reference signal component to the color demodulator system in a color television receiver.

A feature of the invention is the provision, in a color television receiver, of an improved and simplified system by means of which a single signal translating stage is utilized to selectively amplify color subcarrier sideband signal components and to separate and amplify the color burst reference signal component from the chroma signal accompanying a received composite television signal.

Another feature is the provision, in a color television receiver, of an amplification stage which is periodically gated to alternately function in one mode as an amplifier for color subcarrier sideband signal components and in another mode as a separator circuit and an amplifier for the color burst reference signal component which accompany the chroma signal portion of a received composite color television signal.

Another feature is the provision of the circuit means including an electron valve of the high-gain suppressor grid type pentode which has a chroma signal coupled to one control element thereof and periodically occurring keying pulses applied to another control element thereof. Separate output circuits are coupled with further elements of the electron valve, and the keying pulses, which occur during the horizontal blanking interval of a received composite color television signal, provide gating to allow an amplified color burst reference signal to appear at one such output circuit during the blanking interval. Between gating pulses, when the video portion of the received composite color television signal is present, amplified color subcarrier sideband signal components appear at a second separate output circuit.

Other objects, features and attending advantages will become apparent from the following description when considered in conjunction with the accompanying drawing, which is a schematic diagram of a color television receiver constructed to incorporate the improved circuit of the invention.

In practicing the invention there is provided, in a color television receiver, circuit means to combine the functions of color burst reference signal separation and amplification, and of color subcarrier sideband signal amplification, which circuit means utilizes a single signal translating stage. A vacuum tube of the high-gain suppressor grid type pentode has a chroma signal, including color subcarrier sideband signal components and a color burst reference signal component, coupled to its first grid or control grid electrode. Keying pulses, derived from the line sweep system of the receiver so that they occur during the horizontal blanking interval of the received composite television signal, are coupled to its third grid or the suppressor grid electrode. Self-biasing circuit means are further provided to maintain the suppressor grid cutoff during video picture time of the received composite color television signal, when horizontal blanking pulses are not present.

A first output circuit is coupled to the anode electrode of the pentode and a second output circuit is coupled to its second grid or screen grid electrode. During the horizontal blanking interval, when the suppressor grid electrode is gated into conduction by keying pulses, anode-to-cathode current flow allows an amplified color burst reference signal to be derived from the first output circuit. In the absence of keying pulses, when the suppressor grid is cut off, current flows between the screen grid and the cathode electrode and the tube functions as a triode to supply amplified color subcarrier sideband signal components to the second output circuit.

Referring now to the drawing, the color television receiver therein shown includes tuner 12 to receive and convert incoming color television signals appearing at antenna 10. Tuner 12 may include, for example, the radio frequency (RF) stages of the receiver as well as the first detector or mixer and associated local oscillator. The output intermediate frequency signal developed by tuner 12 is coupled through intermediate frequency (IF) stages 14 to the second detector or video detector 16. The detected composite video signal is supplied from video detector 16 to video amplifier 18, which may include one or more stages of video amplification. The output of video amplifier 18 is coupled to the multiple cathodes of cathode ray color image reproducing device 20. Image reproducing device 20 is of the tri-color type known in the art, and is operable to provide color picture reproduction upon reception of a standardized composite color television signal.

A portion of the detected composite video signal is supplied from video amplifier 18 on lead 23 to the input of synchronizing signal separator circuit 24. The synchronizing signal separator circuit functions in the known manner to provide synchronizing pulses in response to the synchronizing signal portion of the detected composite video signal. Synchronizing pulses thereby derived are supplied on leads 25 and 27 to field sweep system 28 and line sweep system 30, respectively. The output of field sweep system 28 is coupled to the field deflection elements (not shown) of color image reproducer 20 while the output of line sweep system 30 is coupled to the line deflection elements (also not shown) of image reproducer 20. These systems function in the known manner to generate synchronized deflection waves to develop a scanning raster in color image reproduction device 20.

Only the brightness signal (*y*) component and the horizontal blanking components of the composite video signal are developed at the output of video amplifier 18 to be supplied to the cathode of image reproducer 20. In the absence of color subcarrier sideband components and color burst reference component, there is provided black and white reproduction of the received composite video signal. To provide color reproduction when such components are present, the detected composite video signal is further processed by chroma bandpass amplifier and automatic phase control system 40 and supplied to color demodulator and amplifier 42. The color subcarrier sideband components are therein demodulated to provide blue ($b-y$) and red ($r-y$) color difference signals, which signals are further matrixed to derive a green ($g-y$) color difference signal. All three color difference signals are supplied to respective grid electrodes of image reproducing device 20 so that the cathode ray beams therein may each be modulated by a different one of the three primary colors.

Color subcarrier sideband components are demodulated by synchronous detection in color demodulation and amplifier 42. Accordingly, it is necessary to provide a reference signal having a precise phase and frequency relationship with the color subcarrier. This reference signal is produced by crystal oscillator 44, and phased locked to the color subcarrier by an automatic phase control loop which includes phase detector 46 and reactance tube 48. A portion of the output of crystal oscillator 44 which is fed to color demodulator 42 on lead 45 is further fed back as one input for phase detector 46 on lead 47. A second input for phase detector 46 consists of the 3.58 megacycle color burst reference signal which is derived from the received composite color signal.

It is apparent from the foregoing that means must be provided in a color television receiver to supply the color subcarrier sideband signal components which fall substantially in the frequency range of 2 to 4.1 megacycles to color demodulator 42, while at the same time supplying a color burst reference signal component of 3.58 megacycles to one input of phase detector 46 to thereby develop a reference signal for color demodulator 42. In accordance with the present invention these two functions are carried out by a single signal translating stage that includes vacuum tube 50, which is a pentode of the high gain suppressor grid type wherein the control or first grid and the suppressor or third grid may be independently utilized as control grids.

The first grid or control grid 51 of tube 50 is coupled by a high pass filter network to video amplifier 18. This removes low frequency components from the composite video signal so that only the chroma signal in the frequency range of 2 to 4.1 megacycles is present at control grid 51. The high pass filter may take the form of a series tuned circuit which includes capacitor 52, coupled between video amplifier 18 and control grid 51, and inductor 53, connected between control grid 51 and ground reference potential. It is to be understood, however, that other known types of high pass filter networks may be used to couple chroma signals from video amplifier 18 to control grid 51 of tube 50. The suppressor grid or third grid 61 of tube 50 is coupled by a resistance-capacitance (RC) network 62, comprised of resistor 64 in parallel with capacitor 65, to one side of primary winding 67 located in horizontal line sweep system 30. Positive going pulses are thereby coupled to suppressor grid 61 during the horizontal retrace interval of the deflection voltages applied to color reproduction device 20.

Anode electrode 71 of tube 50 is connected to one side of the primary winding of transformer 74. The secondary winding of transformer 74, tuned to 3.58 megacycles by capacitor 75, is coupled to one input of phase detector 46. Screen grid electrode 73 of tube 50 is connected to one side of the primary winding of transformer 76. The secondary winding of transformer 76 is coupled to color demodulator 42, either directly or through an additional bandpass amplification stage 77 as shown. The use of bandpass stage 77 is desirable in certain applications in that it provides a control stage to which color killer and automatic chroma control (ACC) signals may be applied.

The other side of the primary windings of both transformers 74 and 76 are connected to one side of resistor 78, which point is coupled to ground reference potential by capacitor 79. The series circuit provided by the primary winding of transformer 76 and capacitor 79 is tuned to provide a high impedance to chroma signals in the frequency range of 2 to 4.1 megacycles, bypassing lower frequency components to ground rerefence potential. The other side of resistor 78 is connected to a source of positive potential to provide anode and screen operating voltages for tube 50. The cathode electrode of tube 50 is connected to ground reference potential by the cathode biasing circuit including resistor 81 shunted by capacitor 82.

The bandpass filter network including capacitor 52 and inductor 53 selects the chroma signal including the color subcarrier sideband components and the color burst reference signal component from the composite video signal translated in video amplifier 18, to the exclusion of the lower frequency intensity and synchronzing components thereof, for coupling to first control grid 51 of tube 50. Keying pulses derived from line sweep system 30 periodically provide positive going pulses for suppressor grid 61 to allow anode-to-cathode current flow in tube 50 during the horizontal blanking interval of the received composite color television signal, resulting in amplified color burst reference signals of 3.58 megacycles being developed across the primary winding of transformer 74.

During this time capacitor 65 of RC network 62 is charged by the keying pulses, and this charge is subsequently retained to provide a reverse bias for suppressor grid 61 during the interval between keying pulses (i.e., during the video information portion of the received composite video signal). The reverse biasing action provided by RC network 62 prevents electron flow to the anode electrode of tube 50, thus diverting current to the screen electrode and resulting in signal being developed across primary winding of transformer 76 during such times as color subcarrier sideband components are present in the chroma signal. Accordingly, tube 50 functions as a triode during intervals between keying pulses for amplification of such sideband components.

The secondary winding of transformer 76 couples amplified color subcarrier sideband signal components falling in the 2 to 4.1 megacycle frequency range to further bandpass amplifier stage 77 and hence to one input of color demodulator 42 on lead 83. The secondary winding of transformer 74 couples the amplified color burst reference signal component of 3.58 megacycles to one input of phase detector 46. This input of phase detector 46 is compared with a second input received from crystal oscillator 44 on lead 47 to develop a corrective signal which is applied to reactance tube 48. With the AFC loop thus completed a reference signal of proper phase and frequency is supplied to demodulator 42 from crystal oscillator 44 for synchronous detection of color subcarrier sideband components developed across transformer 76.

The invention provides, therefore, simple and economical circuit means for deriving subcarrier sideband signal components and a color burst reference signal component from a chroma signal for use in the color demodulation system of a color television receiver. A single vacuum tube is utilized to function in one mode as a triode amplifier for the color subcarrier sideband components which occur during the video information portion of the received composite television signal, and in a second mode as separation and amplification means for the color burst reference signal occurring during the blanking interval of the received composite color television signal.

I claim:

In a color television receiver for utilizing a color television signal, which receiver includes means for translating a detected composite video signal derived from the color television signal, color signal demodulation means, a reference signal source coupled to the color signal demodulation means, and a deflection system for the receiver including a line sweep circuit, the combination including, an electron control device having first and second electrodes providing a current path therebetween, said electron control device further having third, fourth and fifth electrodes disposed in the order named between said first and second electrodes, means for coupling the composite video signal to said third electrode from the means for translating the detected signal, said composite video signal including chroma modulation components and a color burst reference signal component, a first output circuit coupled between the reference signal source and said second electrode of said electron control device for deriving the color burst reference signal component and controlling the reference signal source thereby, a second output circuit coupled between the color signal demodulation means and said fourth electrode of said electron control device for deriving at least the chroma modulation components and applying the same to the color signal demodulation means, a coupling circuit connected between said fifth electrode and the line sweep circuit of the receiver for applying keying pulses in time coincidence with the color burst reference signal component to said electron control device, said coupling circuit including a time constant bias network to provide conduction in said electron control device to said second electrode only during the occurrence of the keying pulse, said time constant network providing a bias to prevent such conduction in the absence of the keying pulses, and siad second output circuit developing at least the chroma modulation components with said second electrode nonconductive, whereby the color burst reference signal component is developed at said second electrode in a form substantially uncontaminated by the chroma modulation components for control of the reference signal source.

References Cited by the Examiner

UNITED STATES PATENTS

| | | | |
|---|---|---|---|
| 2,743,311 | 4/1956 | Richman | 178—5.4 |
| 2,894,059 | 7/1959 | Davis | 178—5.4 |

DAVID G. REDINBAUGH, *Primary Examiner.*

J. A. O'BRIEN, *Assistant Examiner.*